United States Patent [19]

Moriyama

[11] Patent Number: 4,626,718

[45] Date of Patent: Dec. 2, 1986

[54] ROTARY SOLENOID FOR INTERMITTENT INK RIBBON FEEDING

[75] Inventor: Nobuyuki Moriyama, Saga, Japan

[73] Assignee: Ricoh Company, Ltd., Japan

[21] Appl. No.: 442,897

[22] Filed: Nov. 19, 1982

[30] Foreign Application Priority Data

Nov. 20, 1981 [JP] Japan .................................. 56-186594

[51] Int. Cl.$^4$ ............................................. H02K 33/00
[52] U.S. Cl. ...................................... 310/37; 400/225
[58] Field of Search .................................... 310/36–39, 310/20–29, 49; 335/272; 400/225

[56] References Cited

U.S. PATENT DOCUMENTS

| | | | |
|---|---|---|---|
| 2,741,712 | 4/1956 | Lonnqvist | 310/37 |
| 3,143,674 | 8/1964 | Bond | 310/37 |
| 3,202,849 | 8/1965 | Neal | 310/37 |
| 3,349,262 | 10/1967 | Gibbons | 310/37 |
| 3,351,789 | 11/1967 | Berthing | 310/37 |
| 3,803,431 | 4/1974 | Inabo | 310/49 |
| 3,954,167 | 5/1976 | Kranz | 400/225 |
| 4,350,907 | 9/1982 | Shindo et al. | 310/37 |
| 4,436,192 | 3/1984 | Longrod | 400/225 X |
| 4,538,931 | 9/1985 | Nagashima | 400/225 X |

Primary Examiner—Donovan F. Duggan
Attorney, Agent, or Firm—Guy W. Shoup

[57] ABSTRACT

A rotary solenoid includes a rotating shaft on which a rotor is fixedly mounted, a pair of stators arranged on both sides of the rotor and a driving coil disposed around the stators. The opposed arrangement of the pair of stators allows to rotate the rotating shaft at high speed. When the rotary solenoid is combined with a one-way clutch, there is provided an apparatus for converting an oscillating rotary motion into an incremental and intermittent rotary motion, which may be advantageously applied to a system for advancing an ink ribbon in a printer and the like.

30 Claims, 33 Drawing Figures

Fig. la
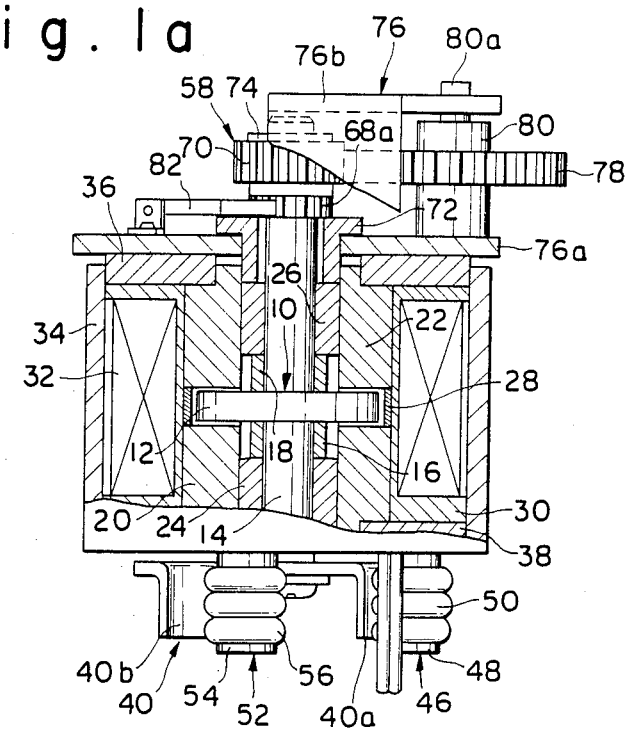
Fig. lb
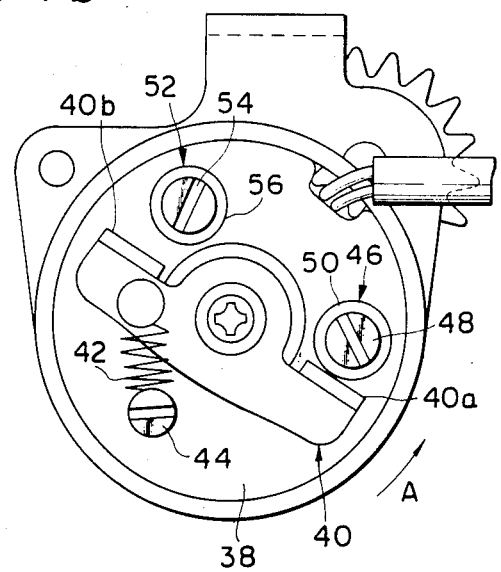

Fig. 17
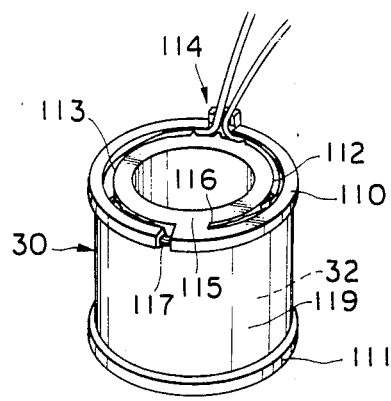
Fig. 18
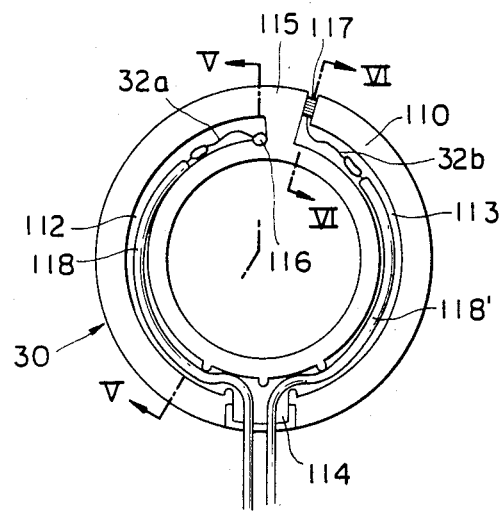
Fig. 19b
Fig. 19a
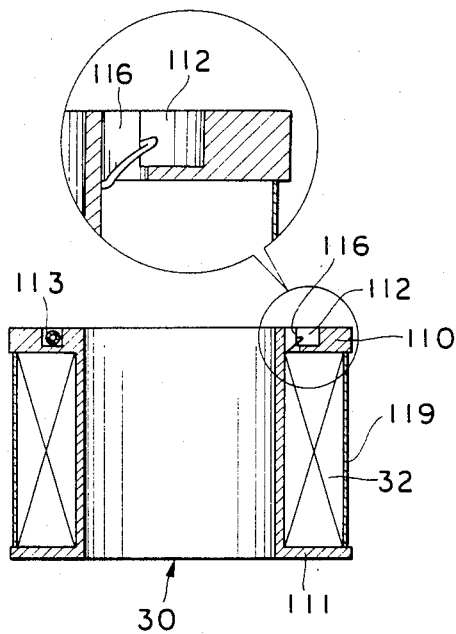
Fig. 20
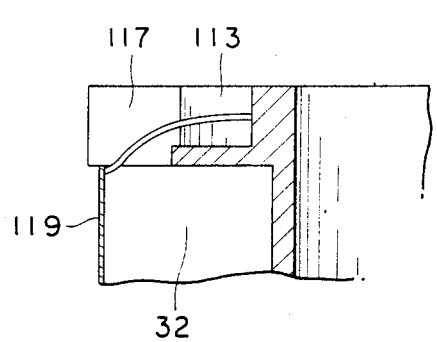

ROTARY SOLENOID FOR INTERMITTENT INK RIBBON FEEDING

BACKGROUND OF THE INVENTION

1. Field of the Invention

This invention generally relates to a rotary driving mechanism for driving to rotate a rotating shaft intermittently over a predetermined angle and in particular to a rotary solenoid including a rotatable rotor, stator with magnetic poles and a coil whereby the stator is periodically energized by the coil to cause the rotor to rotate back and forth over a predetermined angle. More specifically, the present invention relates to an ink ribbon feeding apparatus of a printer for driving to move the ink ribbon housed in an ink ribbon cartridge intermittently at high speed as characters are printed on paper.

2. Description of the Prior Art

In typewriters and printers, an ink ribbon cartridge is widely used because of its convenience. The ink ribbon cartridge is usually comprised of a housing, a supply reel, a take-up reel and an ink ribbon which is wound around the supply reel before use. It is necessary to provide a driving mechanism in a printer to drive to move the ink ribbon intermittently at a predetermined pitch when desired characters are to be imprinted on paper with the ink ribbon cartridge mounted in position. In particular, in a serial printer, the ink ribbon must be moved over a predetermined distance after printing a selected character at high speed.

A rotary solenoid has been used in a printer to drive to move the ink ribbon intermittently. Such a rotary solenoid typically includes a rotor fixedly mounted on a rotatable shaft, a stator provided with magnetic poles, a driving coil which is periodically energized to cause magnetic interaction between the rotor and the stator and a one-way clutch for converting the oscillating rotary motion into incremental intermittent rotary motion. The driving shaft provided at the output side of the one-way clutch is operatively coupled to the take-up reel when the ink ribbon cartridge is mounted in position, so that the ink ribbon may be advanced incrementally by operating the rotary solenoid. However, as printing speed increases, driving power requirements are increased. Thus there has been a need for developing a high power rotary solenoid which may be advantageously applied in high speed typewriters and printers. It is also necessary to keep the rotary solenoid compact in size even if its capacity is increased because it will prevent the typewriter or printer from becoming bulky.

SUMMARY OF THE INVENTION

It is therefore a primary object of the present invention to provide an improved rotary solenoid as a means for converting the reciprocating rotary motion into the incremental rotary motion.

Another object of the present invention is to provide a rotary solenoid which is particularly suited for use in a typewriter or printer as a means for advancing the ink ribbon intermittently.

A further object of the present invention is to provide a rotary solenoid of increased capacity which may be operated at high speed.

A still further object of the present invention is to provide a high power rotary solenoid which is compact in size.

A still further object of the present invention is to provide a rotary solenoid whose oscillating frequency may be easily adjusted.

A still further object of the present invention is to provide an improved ink ribbon feeding apparatus of a typewriter or printer which is capable of feeding the ink ribbon intermittently at a predetermined pitch with high precision.

A still further object of the present invention is to provide an improved ink ribbon feeding apparatus of a printer and the like which is adapted for advancing the ink ribbon housed in an ink ribbon cartridge.

Other objects, advantages and novel features of the present invention will become apparent from the following detailed description of the invention when considered in conjunction with the accompanying drawings.

BRIEF DESCRIPTION OF THE DRAWINGS

FIG. 1a is a schematic illustration partly in cross-section showing the ink ribbon feeding apparatus including the rotary solenoid embodying the present invention;

FIG. 1b is a bottom plan view of the structure shown in FIG. 1a;

FIG. 3 is a perspective view showing the rotor forming a part of the rotary solenoid section of FIG. 1a;

FIG. 8 is a top plan view of the top plate of the ink ribbon feeding apparatus of FIG. 1a;

FIG. 17 is a perspective view showing the bobbin to be used in the rotary solenoid constructed in accordance with the present invention;

FIG. 18 is a top plan view, shown on an enlarged scale, of the bobbin of FIG. 17;

FIG. 19a is a longitudinal cross-sectional view of the bobbin;

FIG. 19b is an enlarged view showing the encircled section of the bobbin in detail;

FIG. 20 is an enlarged view showing another section of the bobbin in detail;

DESCRIPTION OF THE PREFERRED EMBODIMENTS

Referring now to FIGS. 1a and 1b, there is shown an ink ribbon feeding apparatus incorporated therein a rotary solenoid constructed in accordance with the present invention. At first, it is to be noted that the ink ribbon feeding mechanism is essentially comprised of a rotary solenoid section and a one-way clutch section. The rotary solenoid produces the reciprocating rotary motion which is converted into the incremental rotary motion by the one-way clutch.

Figure 3:
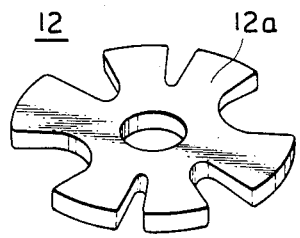

As shown, the rotary solenoid includes a rotor 10 which is comprised of a rotor disc 12 and a rotating shaft 14 to which the rotor disc 12 is fixedly attached. As shown in FIG. 3, the rotor disc 12 includes a plurality (six in the illustrated embodiment) of vanes 12a extending radially and it is formed by a magnetic material. The rotating shaft 14 extends through the rotor disc 12 at its center and the rotor disc 12 is fixed to the shaft 14 approximately at its midway. A pair of collars 16, 18 is tightly fitted onto the rotating shaft 14 each on the opposite side with respect to the rotor disc 12. Also provided is a pair of bearings 24, 26 each of which is fitted onto the shaft 14 adjacent the corresponding collar 16 or 18. The bearings 24 and 26 are fixedly fitted into the bore of cylindrical stators 20 and 22, respectively, so that they support the rotating shaft 14 rotatably and limit its axial movement.

Figure 4:
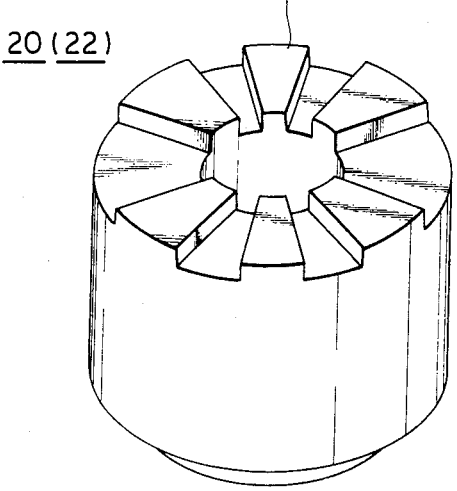
FIG. 4 is a perspective view showing the stator to be used in combination with the rotor of FIG. 3 in the present rotary solenoid.

The cylindrical stators 20 and 22 are oppositely arranged, and the spacing between the opposed surfaces of the stators 20, 22 is determined by a spacer 28 which is disposed concentrically with the rotor disc 12. Each of the stators 20, 22 has the structure as shown in FIG. 4, and it has a plurality (six in the illustrated embodiment) of magnetic pole sections 20a or 22a formed by projections extending axially at one end. These stators 20 and 22 are arranged with their magnetic pole ends opposed to each other. There is also provided a bobbin 30 comprised of a cylinder and top and bottom flanges which extend radially from the top and bottom ends of the cylinder. The stators 20 and 22 are received in the cylinder of the bobbin 30. A driving coil 32 is wound around the bobbin 30. All of the above-described components are housed in a cylindrical case 34 into which top and bottom end plates 36, 38 may be mounted to keep the bobbin 30, stators 20, 22 and the remaining components in position.

The bottom end portion of the rotating shaft 14 extends downwardly through the center hole provided in the bottom end plate 38, and a rocking lever 40 is fixedly mounted at the bottom end of the shaft 14. The rocking lever 40 extends along the surface of the bottom end plate 38 generally in the direction of its diameter, and it is provided with lugs 40a, 40b formed at the opposite ends of the lever 40. Also provided is a coil spring 42 having its one end fixed to the one end of the lever 40 (the end having the lug 40b in the illustrated example) and its the other end fixed to a pin 44 which is planted in the bottom end plate 38. As a result, the rocking lever 40 is normally biased to rotate counterclockwise or in the direction indicated by the arrow A, and the rotation of the lever 40 in the counterclockwise direction is restrained when the lug 40a comes into abutment against a stopper 46 which is comprised of a pole 48 planted in the bottom end plate 38 and a plurality of rubber rings 50 fitted onto the pole 48.

Figure 5:
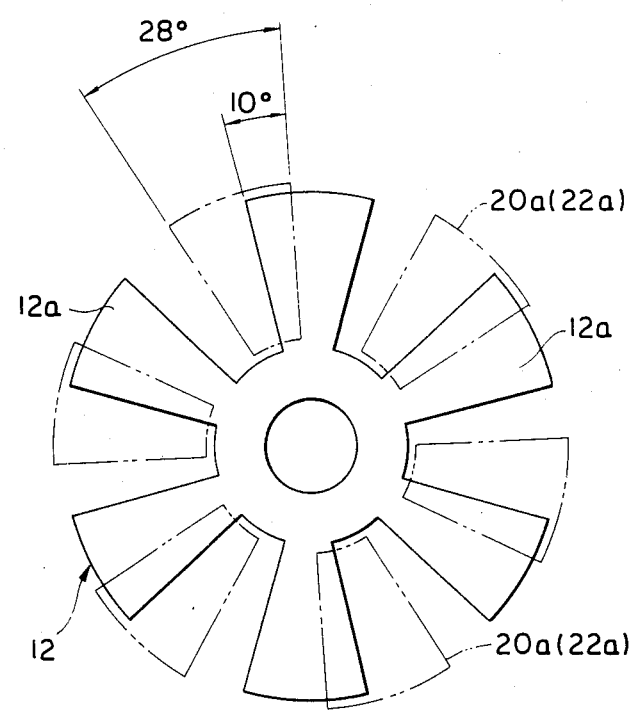
FIG. 5 is a schematic illustration showing the relative positional relationship between the rotor and the stator which is useful for explaining the operation of the rotary solenoid.

In the case when the lug 40a is urged to be in contact with the stopper 46, the vanes 12a of the rotor 10 are positioned such that they are out of phase with respect to the pole sections 20a, 22a of the stators 20, 22, as shown in FIG. 5. In the illustrated example, the vanes 12a are shifted in the clockwise direction, each vane 12a having a portion overlapping with the corresponding pole sections 20a, 22a of the stators over 10 degrees. Another stopper 52 is provided on the bottom plate 38 at the location to limit the clockwise rotation of the lever 40 when the lever 40 is driven to rotate clockwise against the force of the spring 42. The stopper 52 is comprised of a pole 54 planted in the bottom end plate 38 and a plurality of rubber rings 56 fitted onto the pole 54 similarly with the stopper 46.

Figure 6:
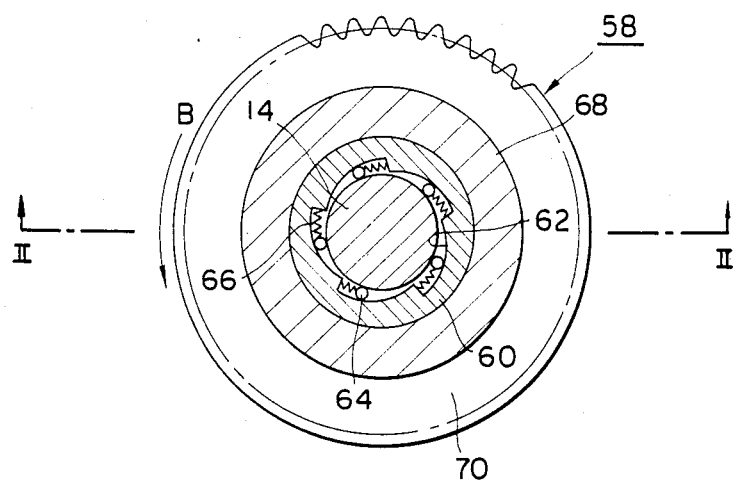
FIG. 6 is a cross-sectional view of the one-way clutch, taken along I—I line indicated in FIG. 7, which forms a part of the ink ribbon feeding apparatus and which is to be used in combination with the rotary solenoid.
Figure 7:
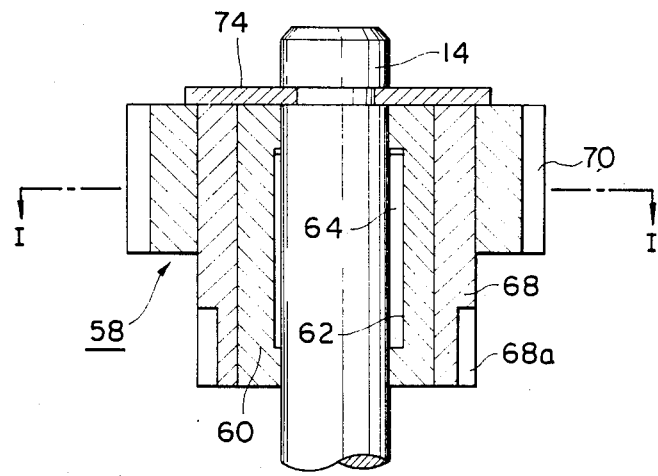
FIG. 7 is a cross-sectional view of the one-way clutch taken along II—II line indicated in FIG. 6.

The top end portion of the rotating shaft 14 extends upwardly through the center hole provided in the top end plate 36, and a one-way clutch 58 is provided at the top end portion of the shaft 14. It is to be noted that any well-known device capable of converting the reciprocating rotary motion into the incremental rotary motion may be used for the one-way clutch 58. FIGS. 6 and 7 show the structure of the one-way clutch 58 incorporated in the present apparatus. As shown, fitted onto the top end portion of the shaft 14 is an inner sleeve 60 which is provided with a plurality (five in the illustrated example) of profiled recesses 62 on its inner surface. Each of the recesses 62 is so formed that it becomes gradually shallower in the counterclockwise direction thereby a wedge-shaped gap is defined between the shaft 14 and the inner sleeve 60. In each of the recesses 62 is positioned a roller 64 which is urged to the shallower side by means of a spring 66. An outer sleeve 68 is tightly fitted onto the inner sleeve 62, which are virtually of the same length. The outer sleeve 68 is provided with ratchet teeth 68a at its outer bottom portion and a gear 70 is fixedly fitted onto the upper section of the outer sleeve 68.

Figure 8:
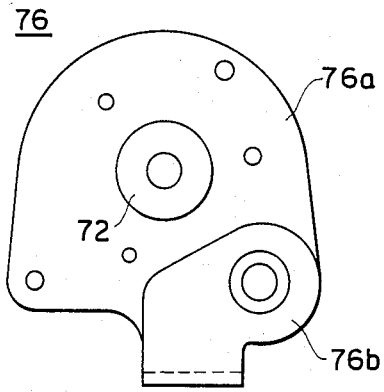
Figure 9:
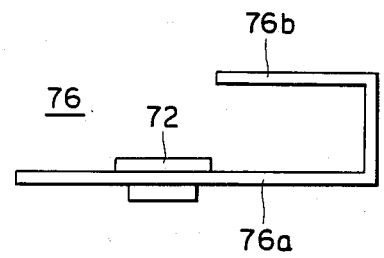
FIG. 9 is a front view illustrating the top plate of FIG. 9.
Figure 10:
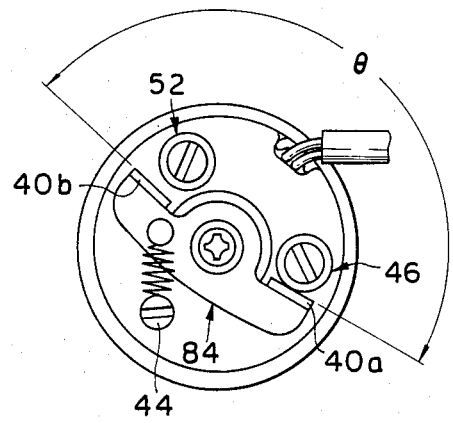
FIG. 10 is the bottom plan view of the rotary solenoid of the ink ribbon feeding apparatus which is useful for explaining the adjustment of the angle of reciprocating rotary motion.

When assembled, the above-described one-way clutch 58 sits on a bearing 72 and a stopper ring 74 may be snapped into the groove provided in the shaft 14 so that the one-way clutch 58 is prevented from falling apart. The bearing 72 is tightly fitted into the opening provided in a support plate 76 which is mounted on the top end plate 36. As shown in FIGS. 8 and 9, the support plate 76 includes a base section 76a in which the bearing 72 is fixedly provided and an arm section 76b which is formed integrally with and bent from the base section 76a. As shown in FIG. 1a, a transmission gear 78 is rotatably supported between the base and arm sections 76a, 76b of the support plate 76.

When the support plate 76 is placed on the top plate 36, the bottom projection of the bearing 72 is fitted into the bore of the upper stator 22 and then the base section 76a of the support plate 76 is fixedly attached to the top plate 36 by means of screws (not shown). When assembled, the transmission gear 78 comes into mesh with the gear 70 of the one-way clutch 58. Furthermore, on the base section 76a is pivotally mounted a pawl 82 which is comprised of a leaf spring and which has its forward end pressed against the ratchet teeth 68a of the one-way clutch 58.

In operation, while the driving coil 32 is not energized, the rotor 10 stays still with the lug 40a in abutment against the stopper 46 due to the recovery force of the coil spring 42. However, when the coil 32 is energized by passing current therethrough, there is produced a magnetic field which passes through the upper and lower stators 20, 22 so that the pole sections 20a, 22a are magnetized to function as magnetic poles, which then exerts magnetic interacting forces to the vanes 12a of the rotor 10. As a result, the rotor 10 is caused to rotate counterclockwise against the force of the coil spring 42 until the lug 40b of the lever 40 is brought into abutment against the stopper 52. Upon termination of supply of current, the coil 32 becomes deenergized and thus the rotor 10 rotates clockwise due to the recovery force of the coil spring 42 until the lug 40a comes into abutment against the stopper 46.

In this manner, the rotor 10 causes the rotating shaft 14 to execute a reciprocating rotary motion which is then converted into an incremental rotary motion through the one-way clutch 58, and such an incremental rotary motion is transmitted to the transmission gear 78 whose rotating shaft 80 has its top end portion extended through the arm section 76b of the support plate 76 to appear thereabove to form a link end 80a, which may be inserted into an ink ribbon cartridge for advancing an ink ribbon housed therein. Stated more in detail with respect to the operation of the one-way clutch 58, when the driving coil 32 is energized, the rotating shaft 14 is driven to rotate counterclockwise as indicated by the arrow B in FIG. 6, each of the rollers 64 disposed in the corresponding recesses 62 is forced into the narrower side of the recess to establish coupling between the driving side (shaft 14) and the driven side (sleeve 60) so that the gear 70 also starts to rotate counterclockwise. On the other hand, when the driving coil 32 is deenergized and thus the rotating shaft 14 starts to rotate clockwise, the rollers 64 are moved against the spring 66 to be set free and thus the gear 70 becomes decoupled from the rotating shaft 14. It is to be noted that since the pawl 82 immediately comes into engagement with the ratchet teeth 68a, the gear 70 is prevented from being rotated any further even if the rotating shaft 14 continues to rotate clockwise.

As described above, in accordance with the present invention, the rocking lever 40 is fixedly mounted to the rotating shaft 14 and the angle of rotation of the lever 40 and thus the shaft 14 is regulated by the relative position of the pair of stoppers 46 and 52. This angle then determines the pitch of the incremental rotary motion when converted by the one-way clutch 58. Thus, by replacing the rocking lever 40 with another rocking lever 84 having a differing angle $\theta$, the pitch of the incremental rotary motion may be varied quite easily. It should further be noted that either one or both of the stoppers 46, 52 may be so provided as to be adjusted in position on the bottom plate 38 by any conventional means well known for those skilled in the art instead of or in addition to the above-described lever replacement scheme.

Figure 11:
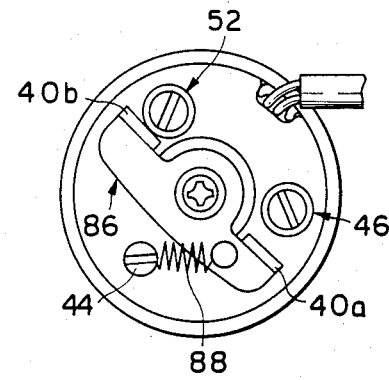
FIG. 11 is the bottom plan view of another embodiment of the rotary solenoid of the present ink ribbon feeding apparatus constructed in accordance with the present invention.

FIG. 11 shows another embodiment of the present invention in which provision is made of a rocking lever 86 which is normally urged to bring the lug 40b in abutment against the stopper 52 because a coil spring 88 is provided as extended between the pin 44 and that end of the lever 86 which is provided with the lug 40a. With such an arrangement, the rotor 10 and thus the rotating axis 14 may be rotated in the opposite direction as compared with the previous cases.

Figure 2:
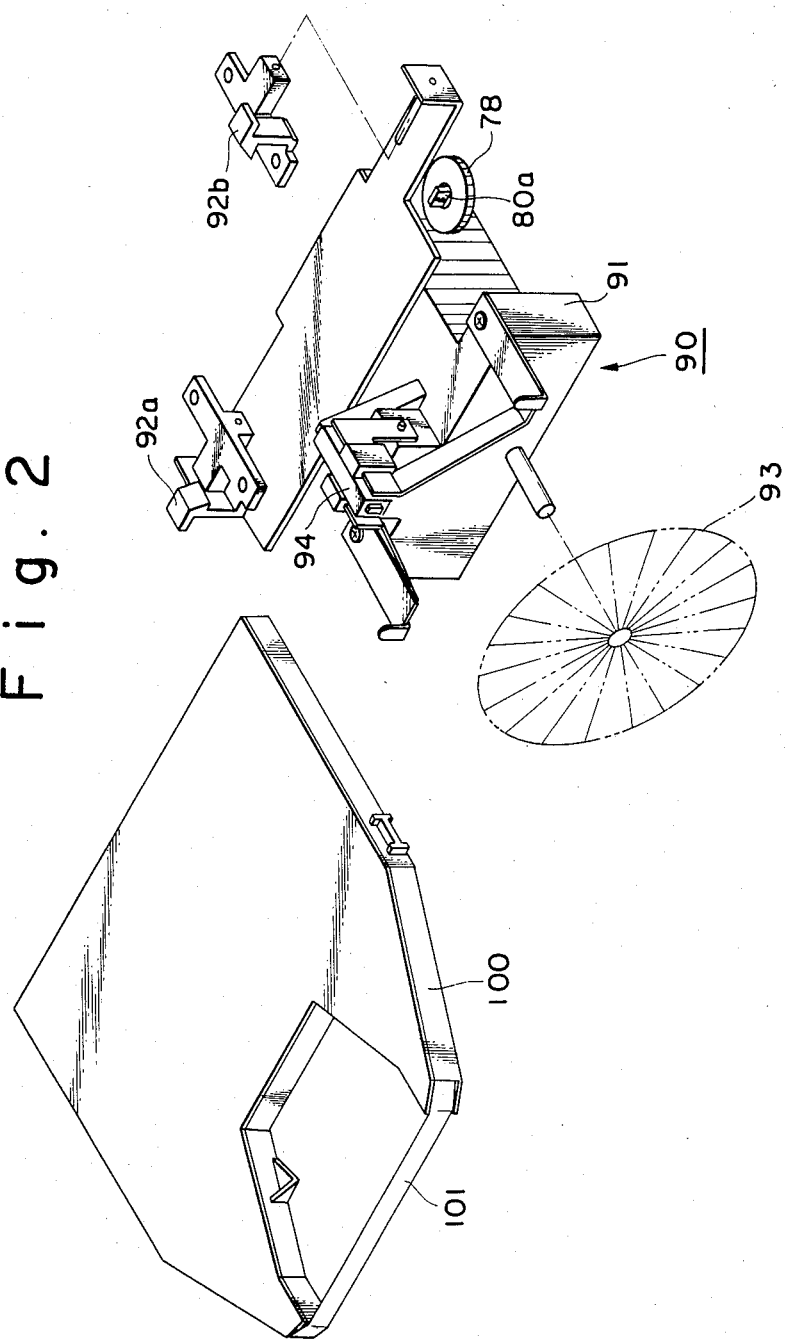
FIG. 2 is a partly exploded perspective view showing the printer head of a typical serial printer to which the present ink ribbon feeding apparatus may be advantageously applied for advancing the ink ribbon intermittently.

Referring back to FIG. 2, there is shown a printer head 90 into which the present ink ribbon feeding apparatus may be incorporated. In FIG. 2, there is only shown the transmission gear 78 and the link end 80a of the ink ribbon feeding apparatus for the sake of simplicity. As shown, the printer head 90 includes a carriage 91 on which an ink ribbon cartridge 100 may be securely held in position with the help of a pair of holding members 92a and 92b which are pivotally provided on the carriage 91. The cartridge 100 houses therein a role of ink ribbon 101 wound around a supply reel, which is advanced to be wound around a take-up reel as the printing operation takes place. The printer head 90 also includes a daisy wheel 93 carrying thereon a plurality of types. The daisy wheel 93 is rotated to locate the selected type at the printing position and a printing hammer 94 is moved forward to press the selected type against the ink ribbon 101 to form an imprint on paper (not shown). As will be described later, the link end 80a is fitted into the cartridge 100 to be coupled to the power transmission mechanism connected to the take-up reel built in the cartridge 100.

Figure 12A:
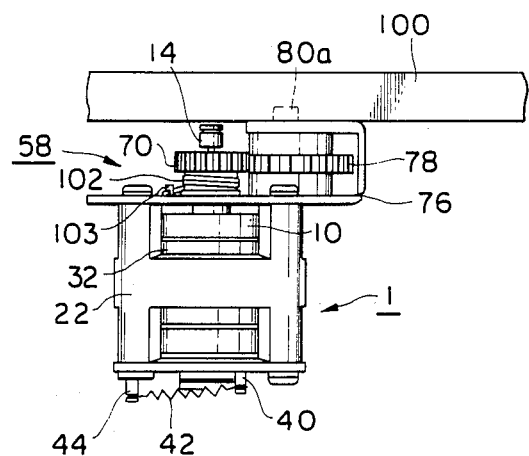
FIG. 12a is a schematic illustration showing another embodiment of the ink ribbon feeding apparatus constructed in accordance with the present invention.
Figure 12B:
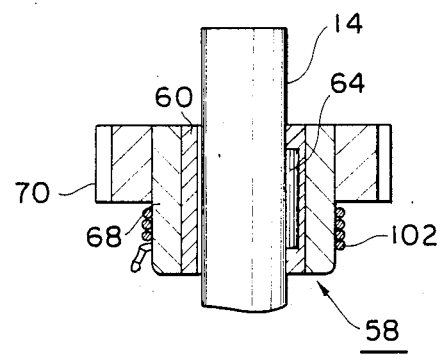
FIG. 12b is a fragmentary cross-sectional view showing on an enlarged scale the one-way clutch section of the apparatus shown in FIG. 12.
Figure 13:
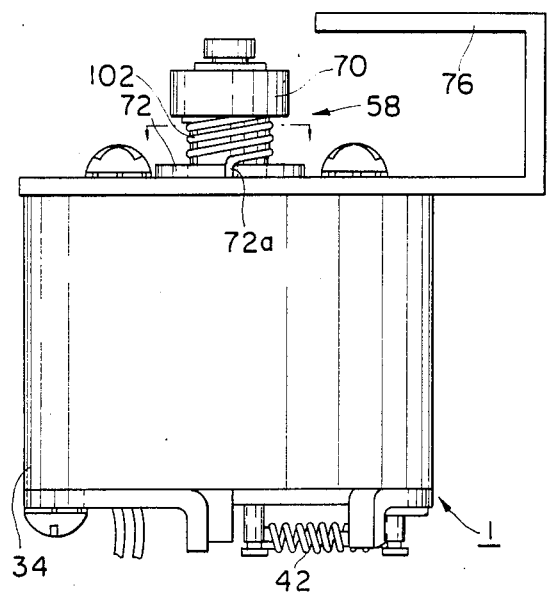
FIG. 13 is a schematic illustration showing a further embodiment of the ink ribbon feeding apparatus constructed in accordance with the present invention.
Figure 15:
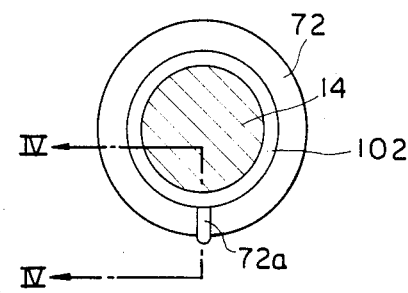
FIG. 15 is an enlarged cross-sectional view taken along III—III line indicated in FIG. 13.
Figure 14:
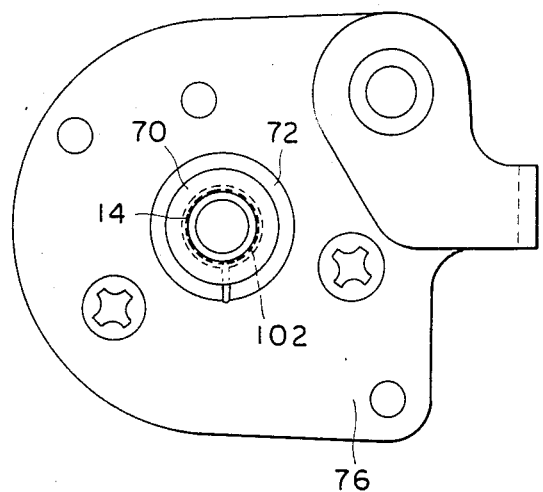
FIG. 14 is a top plan view of the apparatus shown in FIG. 13.
Figure 16:
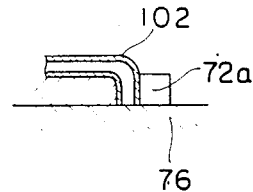
FIG. 16 is a cross-sectional view taken along IV—IV line indicated in FIG. 15.

FIGS. 12a and 12b show another embodiment of the ink ribbon feeding apparatus constructed in accordance with the present invention. It is to be noted that like numerals indicate like elements as practiced throughout the present specification. As shown, the ink ribbon feeding apparatus mainly comprised of the rotary solenoid 1 and the one-way clutch 58 is operatively coupled to the cartridge 100. As described previously, the driving coil 34 is periodically energized to produce the reciprocating rotary motion of the rotor 10, which is then converted into the incremental rotary motion of the rotor gear 70 through the one-way clutch 58. The thus converted incremental rotary motion is then transmitted to the link end 80a to advance the ink ribbon 101 step by step as the printing operation proceeds.

In the embodiment shown in FIGS. 12a and 12b, it is to be noted that a clutch spring 102 is snugly fitted onto the outer sleeve 68, and the bottom end of the spring 102 is fixedly held by a holding member 103 provided on the support plate 76. Thus, when the rotor gear 70 rotates in the direction B as shown in FIG. 6, the spring 102 is loosened to allow smooth rotation of the gear 70; on the other hand, when the gear 70 rotates in the opposite direction, the spring 102 becomes tightened to restrain rotation of the gear 70.

As a result, when the driving coil 32 is energized to cause the rotor 10 to rotate counterclockwise, the rotating shaft 14 also rotates counterclockwise to have the shaft 14 coupled to the rotor gear 70 through the restrained rollers 64. Thus the rotating power is transmitted to the ribbon feeding mechanism built in the cartridge 100 through the transmission gear 78 to have the ink ribbon advanced over a predetermined pitch. Then the driving coil 32 is deenergized and the rotor 10 and the shaft 14 are driven to rotate clockwise due to the recovery force of the spring 42, during which the rollers 64 are released to decouple the gear 70 from the shaft 14. At this time, should the shaft 14 exert a force tending to rotate the gear 70 clockwise for some reason, the gear 70 is prevented from being rotated clockwise because it is securely held by the spring 102. In this manner, reverse movement of the ink ribbon 101 may be effectively prevented form occurring with a simple structure.

FIGS. 13 through 16 show a further embodiment of the present invention. As shown, this embodiment is characterized in the structure for holding the bottom end of the clutch spring 102 which is snugly fitted onto the outer sleeve 68 of the one-way clutch 58. That is, there is provided a notch 72a extending radially in the flange of the bearing 72 and the bottom end of the clutch spring 102 is fitted therein thereby preventing the spring 102 from being rotated around the outer sleeve 68 of the one-way clutch 58. This structure is advantageous because it is not necessary to provide a separate member such as the holding member 103 in the previous case.

Now, a description will be had with respect to a particular structure of a bobbin to be used in the rotary solenoid. As shown in FIG. 17, the bobbin 30 includes a cylinder and top and bottom flanges 110, 111 extending from the top and bottom ends of the cylinder. In the top surface of the top flange 110 are formed a semicircularly shaped groove 112 into which the leading portion of the wire for forming the coil 32 is to be inserted and another semicircularly shaped groove 113 into which the trailing portion of the wire is to be inserted. At the junction between the grooves 112 and 113 is provided a lead groove 114 which is cut away toward the outer periphery of the top flange 110. On the other hand, there is provided a partition section 115 at the other ends of the grooves 112 and 113.

At the end of the groove 112 adjacent the partition section 115 is provided a through-hole 116 which extends through the cylinder along its axial direction to the other end of the bobbin 30. Also provided is a cutaway groove 117 which extends radially from the end of the groove 113 adjacent the partition section 115 to the outer periphery of the bobbin 30.

The coil 32 is to be formed by having the wire wound around the cylinder of the bobbin 30 between the top and bottom flanges 110, 111. The leading portion 32a of the wire for forming the coil 32 is first lead to the bottom end from the groove 113 through the hole 116 and then the wire is placed around the cylinder of the bobbin 30. The trailing portion 32b of the wire is placed into the groove 113 via the cut-away groove 117. Then the leading and trailing portions 32a, 32b of the wire are bonded to leads 118, 118', for example, by soldering and the leads 118, 118' are placed in the respective grooves 113, 112 and lead out for connection to an exterior circuit via the lead groove 114. It is to be noted that an insulating film or tape 119 is usually placed on the periphery of the bobbin 30 before winding the wire to form the coil 32. It should further be noted that the partition section 115 may be removed and the grooves 112 and 113 may be connected to form a complete circular groove, if desired.

Figure 21:
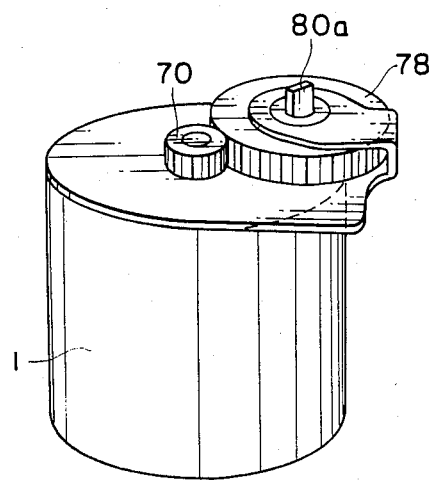
FIG. 21 is a perspective view showing only the driving mechanism of the ink ribbon feeding apparatus.
Figure 22:
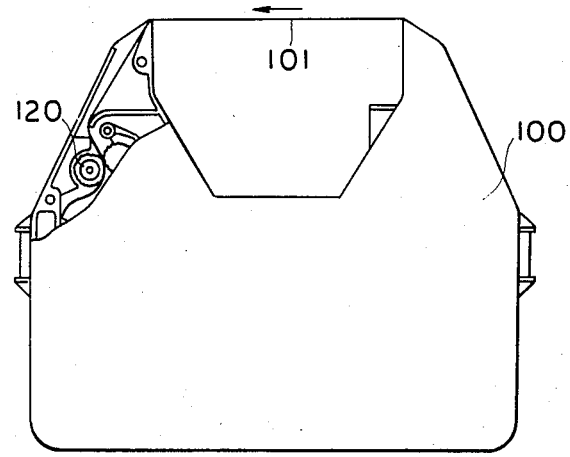
FIG. 22 is a partially cut-away top plan view showing the ink ribbon cartridge which may be used with the present ink ribbon feeding apparatus.
Figure 23:
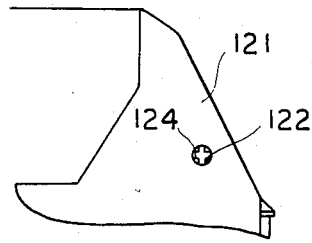
FIG. 23 is a partial bottom plan view showing that portion of the cartridge which is linked to the ink ribbon feeding apparatus.

FIG. 21 shows the ink ribbon feeding apparatus in a simplified manner and as described previously it includes the rotary solenoid 1 and the one-way clutch whose output gear 70 is driven to rotate in a predetermined direction incrementally at a predetermined pitch. Such an intermittent rotary motion is transmitted to the link end 80a through the gear 78 which is integral with the link end 80a. FIG. 22 shows the ink ribbon cartridge 100 with its top cover partly removed to show a linking gear 120 which has a cross-shaped groove 124 at its bottom as shown in FIG. 23, which shows a part of the back side 121 of the cartridge 100 and a hole 122 provided in the back side 121 for allowing the link end 80a to be inserted into the cartridge 100 to establish operative connection with the linking gear 120.

Figure 24:
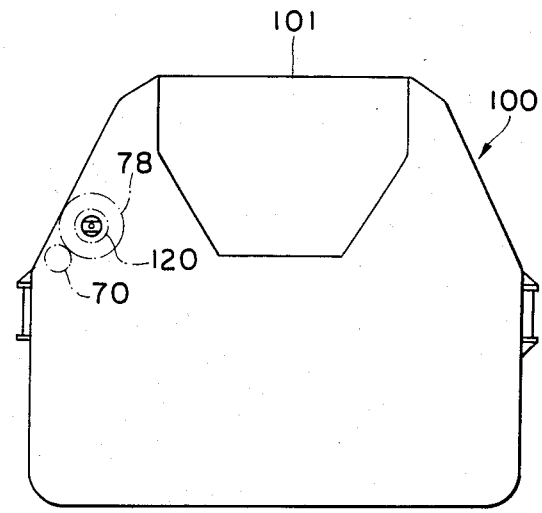
FIG. 24 is a schematic illustration showing the condition when the cartridge is linked to the ink ribbon feeding apparatus of FIG. 21.

FIG. 24 illustrates the relationship between the gears 70 and 78 of the feeding apparatus and the cartridge 100 when the cartridge 100 is properly set in position. Under the condition, when the gear 70 is driven to rotate incrementally, the ink ribbon 101 is advanced step by step at a predetermined pitch after printing a selected character in the direction indicated by the arrow in FIG. 22. However, it sometimes happens that the ink ribbon 101 becomes slacked for various reasons. If such a ribbon slacking happens, it is necessary to reset the ribbon in tension in order to carry out a proper printing operation. In the arrangement shown in FIG. 24, however, the gears 70 and 78 are not accessible so that ribbon resetting can be done only with difficulty.

Figure 25:
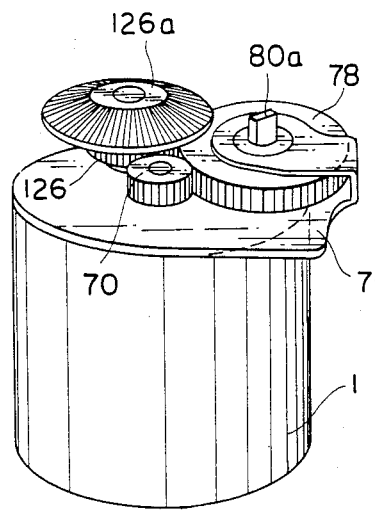
FIG. 25 is a perspective view showing a modified ink ribbon feeding apparatus which is provided with a thumb wheel for allowing to rotate the driving shaft of the apparatus manually, if necessary.
Figure 26:
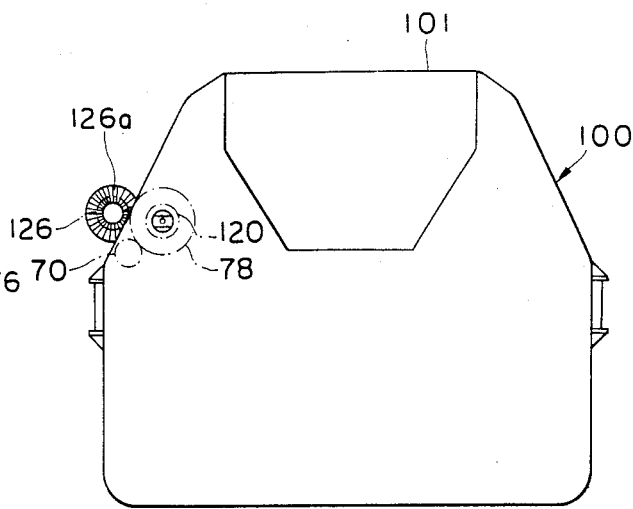
FIG. 26 is a schematic illustration showing the condition when the cartridge is linked to the modified ink ribbon feeding apparatus of FIG. 25.

FIG. 25 shows a modification of the structure of FIG. 24 and it is so structured that the ink ribbon 101 may be manually set in tension with ease. That is, as shown in FIG. 25, in addition to the gears 70 and 78, there is provided another gear 126 which is an idle gear rotatably supported on the support plate 76 in mesh with the gear 78. Thus the gear 126 is driven to rotate by the gear 78 without restraint when the gear 78 is driven to rotate by the gear 70. A thumbwheel 126a is fixedly mounted on the idle gear 126 and preferably a knurl is formed on the top surface of the thumbwheel 126a. Accordingly, when the apparatus is not in operation, the gear 126 may be rotated by rotating the thumbwheel 126a by a finger. In this manner, the link end 80a may be rotated manually to reset the ribbon 101 in tension. FIG. 26 shows the relationship between the ribbon feeding apparatus of FIG. 25 and the cartridge 100 when the cartridge 100 is placed in position. As is obvious, the ribbon 101 may be set in tension by rotating the thumbwheel 126a by a finger easily.

Figure 27:
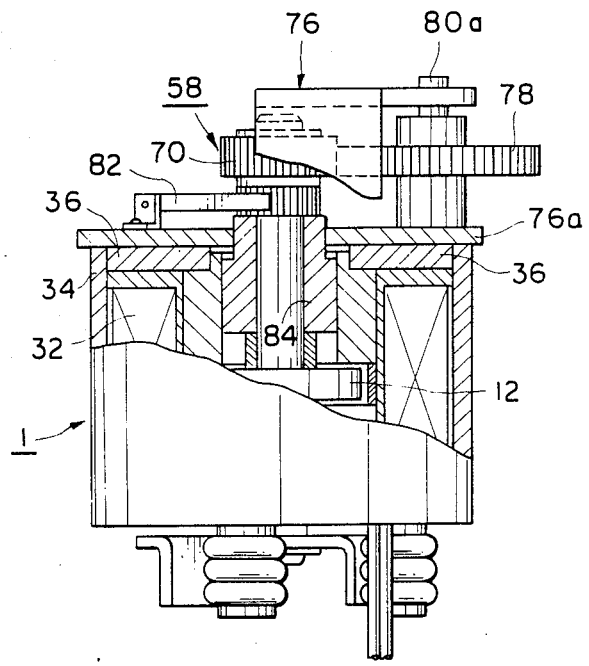
FIG. 27 is a partially cut-away side elevational view showing a still further embodiment of the ink ribbon feeding apparatus constructed in accordance with the present invention.

FIG. 27 illustrates another modification of the present apparatus. In the embodiment shown in FIG. 1a, the thrust bearing 72 is tightly fitted into the hole of the support plate 76 and the downward projection of the bearing 72 is tightly fitted into the bore of the upper stator 22 for positioning the support plate 76. On the other hand, in the embodiment of FIG. 27, use is made of an elongated bearing 84 instead of a combination of the annular bearing 26 and the thrust bearing 72 in FIG. 1a. The elongated bearing 84 extends upward through the center hole of the top end plate 36 and it supports the one-way clutch 58 at its top end. The top end portion of the bearing 84 is tightly fitted into the hole of the support plate 76 for proper positioning of the plate 76.

Figure 28:
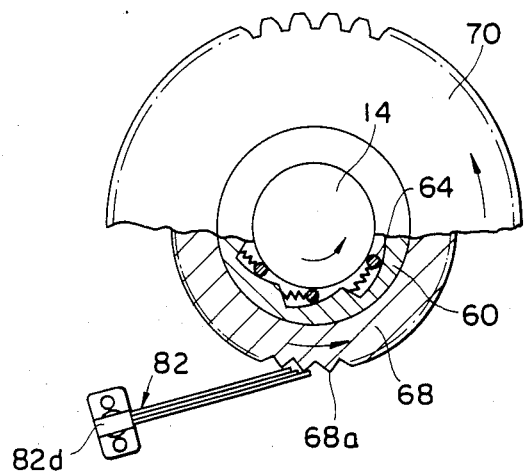
FIG. 28 is a schematic illustration showing in detail the ratchet and pawl mechanism provided in the one-way clutch of the apparatus of FIG. 27.

FIGS. 28 through 31 show several embodiments of the ratchet and pawl mechanism which may be advantageously applied to the present ink ribbon feeding apparatus. In FIG. 28 is shown the pawl 82 comprised of three leaf springs 82a, 82b and 82c which are different in length as will be more fully described later. The pawl 82 is firmly held at its one end by a holder 82d which, in turn, is fixedly attached to the support plate 76, so that the free end of the pawl 82 is lightly pressed against the teeth 68a of the ratchet wheel 68. Thus when the wheel 68 rotates counterclockwise, the pawl 82 is not brought into engagement with the teeth 68a and it slips thereon as the wheel 68 rotates. On the other hand, when the wheel 68 starts to rotate clockwise, the free end of the pawl 82 immediately comes into engagement with the teeth 68a and thus the wheel 68 is prevented from being rotated in this direction.

Figure 29:
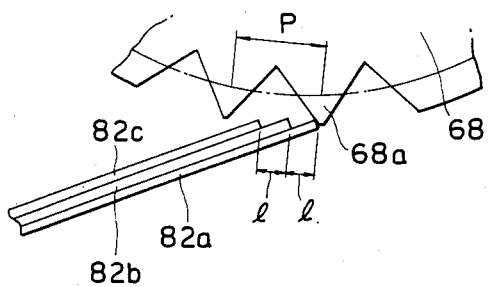
FIG. 29 is a schematic illustration showing further in detail the ratchet and pawl mechanism and how the indented pawl engages with the ratchet.

As best shown in FIG. 29, the three leaf springs 82a-82c are different in length with the leaf spring 82a being longest and the leaf spring 82b being shorter than the leaf spring 82a by the length 1 which corresponds to one third of the pitch of the teeth 68a of the ratchet wheel 68. The shortest leaf spring 82c is shorter than the leaf spring 82b by the length 1. In this manner, there is provided an indentation at the free end of the pawl 82 with the pitch of the indentation smaller than the pitch P of the teeth 68a of the ratchet wheel 68, so that the reverse rotation of the ratchet wheel 68 may be kept minimal.

Figure 30:
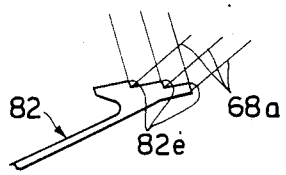
FIG. 30 is a schematic illustration showing another example of the pawl which may be advantageously employed in the present invention.

FIG. 30 shows another example of the indented pawl 82 which is formed by a single body. That is, in FIG. 30, a block is formed at the free end of the resilient spoke and an indentation 82e is defined at the contact surface of the block which comes into contact with the apexes of the teeth 68a when the wheel 68 rotates. It is to be noted that the pitch of such an indentation needs not be limited to one third of the pitch P of the teeth 68a of the ratchet wheel 68 as described above, and the pitch of the indentation may be determined arbitrarily.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A rotary solenoid for producing an oscillatory rotary motion at its output, comprising:
    a rotating shaft which is supported rotatably and which defines the output of said rotary solenoid at one end;
    a rotor fixedly mounted on said rotating shaft, said rotor including a plurality of vanes extending radially;
    a first stator including a plurality of first magnetic pole sections arranged around said rotating shaft at one side of said rotor;
    a second stator including a plurality of second magnetic pole sections arranged around said rotating shaft at the other side of said rotor in an axially opposed relation with respect to said first magnetic pole sections of said first stator;
    means for applying a magnetic field, when activated, to said first and second stators to produce a magnetic interaction between said vanes and said first and second magnetic pole sections thereby causing said rotor and thus said rotating shaft to rotate in accordance with said magnetic interaction; and
    means for urging said rotating shaft to rotate in a predetermined direction, whereby said rotating shaft is rotated in said predetermined direction by said means for urging when said means for applying is deactivated.

2. A rotary solenoid as in claim 1 wherein said means for applying is a coil positioned generally around said first and second stators whereby said first and second magnetic pole sections are magnetized to exert a magnetic interactive force on said vanes when said coil is energized.

3. A rotary solenoid as in claim 2 wherein said coil is energized when a driving current is passed therethrough.

4. A rotary solenoid as in claim 2 further comprising bobbin as a support for said coil, said bobbin including a cylinder and top and bottom flanges extending from the top and bottom ends, respectively, of said cylinder, either one of said flanges being provided with at least one groove in which the bond between the wire forming said coil and a lead is located.

5. A rotary solenoid as in claim 1 further comprising means for limiting the angle of rotation of said rotating shaft.

6. A rotary solenoid as in claim 5 wherein said means for limiting includes a lever fixedly attached to said rotating shaft and a pair of stoppers spaced apart from each other whereby the angle of rotation of said rotating shaft is determined by the abutment between said lever and said stoppers.

7. A rotary solenoid as in claim 6 wherein said means for urging is a spring having its one end fixedly connected to said lever to cause it to normally abut against either one of said pair of stoppers.

8. An apparatus for converting an oscillatory rotary motion into an incremental rotary motion comprising:
    a rotating shaft which is supported rotatably;
    driving means for driving to rotate said rotating shaft over a predetermined angle in an oscillatory manner;
    a driven member which is supported rotatably and driven to rotate together with said rotating shaft when said rotating shaft rotates in a first predetermined direction;

means for operatively coupling said rotating shaft to said driven member when said rotating shaft rotates in said first predetermined direction and decoupling said driven member from said rotating shaft when said rotating shaft rotates in the direction opposite to said first predetermined direction;

means for preventing said driven member from rotating in said opposite direction whereby the oscillating rotary motion of said rotating shaft is precisely converted into the incremental rotary motion of said driven member;

a rotor fixedly mounted on said rotating shaft, said rotor including a plurality of vanes extending in the radial direction thereof;

a first stator including a plurality of first magnetic pole sections arranged around said rotating shaft at one side of said rotor;

a second stator including a plurality of second magnetic pole sections arranged around said rotating shaft at the other side of said rotor in an axially opposed relation with respect to said first magnetic pole sections of said first stator;

means for applying a magnetic field, when activated, to said first and second stator to produce a magnetic interaction between said vanes and said first and second magnetic pole sections thereby causing said rotor and thus rotating shaft to rotate in accordance with said magnetic interaction; and means for urging said rotating shaft to rotate in a predetermined direction, whereby said rotating shaft is rotated in said predetermined direction by said means for urging when said means for applying is deactivated.

9. An apparatus as in claim 8 wherein said driven member includes a sleeve section and said means for preventing includes a coil spring snugly fitted onto said sleeve of said driven member and having one end fixed to a stationary point whereby said coil spring becomes loosened to allow rotation of said driven member when it rotates in said first predetermined direction; whereas, said coil spring becomes tightened to restrain rotation of said driven member when it starts to rotate in said opposite direction.

10. An apparatus as in claim 8 wherein said means for preventing includes a ratchet formed on said driven member and a pawl held stationarily and having a free end engageable with said ratchet.

11. An apparatus as in claim 10 wherein said free end is indented at a pitch which is smaller than the pitch of said ratchet.

12. A rotary solenoid as in claim 1 wherein said plurality of vanes are arranged circumferentially at an equal angular interval.

13. A rotary solenoid as in claim 12 wherein said plurality of vanes are identical and generally sector in shape.

14. A rotary solenoid as in claim 13 wherein said first and second magnetic pole sections are equal in number with said plurality of vanes.

15. A rotary solenoid as in claim 14 wherein said first and second magnetic pole sections are similar in shape to said plurality of vanes and arranged circumferentially at an equal angular interval.

16. A rotary solenoid as in claim 1 wherein each of said first and second stators includes a cylindrical body one end surface of which is provided with the corresponding plurality of said first or second magnetic poles.

17. A rotary solenoid as in claim 16 further comprising bearing means fitted in the cylindrical body of each of said first and second stators for rotatably supporting said rotating shaft.

18. A rotary solenoid as in claim 17 further comprising first gap maintaining means for maintaining a first predetermined gap between said rotor and said bearing means.

19. A rotary solenoid as in claim 18 wherein said first gap maintaining means includes a pair of collars each of which is disposed between said rotor and the corresponding one of said first and second stators as fitted onto said rotating shaft.

20. A rotary solenoid as in claim 19 wherein said pair of collars are fixedly attached to said rotating shaft.

21. A rotary solenoid as in claim 1 further comprising second gap maintaining means for maintaining a second predetermined gap between the opposed surfaces, on which said first and second magnetic pole sections are formed, of said first and second stators in the axial direction of said rotating shaft.

22. A rotary solenoid as in claim 21 wherein said second gap maintaining means includes a spacer which is circular in shape and disposed around said rotor as spaced apart therefrom as interposed between said first and second stators.

23. A rotary solenoid as in claim 1 further comprising moving stopper means fixedly mounted on said rotating shaft and a pair of first and second stationary stopper means provided fixed in position whereby said moving stopper means is engageable with one of said first and second stationary stopper means one at a time thereby limiting the angle of rotation of said rotating shaft.

24. A rotary solenoid as in claim 23 further comprising biasing means for normally biasing said moving stopper means to be in engagement with a predetermined one of said pair of first and second stationary stopper means.

25. A rotary solenoid as in claim 24 wherein said moving stopper means includes a rocking lever fixedly attached to the bottom end of said rotating shaft and each of said first and second stationary stopper means includes a pole fixedly provided at a bottom plate which defines part of a housing of said rotary solenoid.

26. A rotary solenoid as in claim 25 wherein said rocking lever is provided with a pair of first and second lugs which is brought into engagement with the corresponding one of said pair of first and second stationary stopper means.

27. A rotary solenoid as in claim 25 wherein said pole is provided with an elastic member therearound at least partly.

28. A rotary solenoid as in claim 24 further including a one-way clutch mechanism operatively coupled to said rotating shaft thereby allowing to convert the angular oscillating movement of said rotating shaft into an incremental rotary motion.

29. A rotary solenoid as in claim 27 wherein said one-way clutch is so structured to be operatively coupled to a ribbon feed mechanism for feeding printing ribbon.

30. A rotary solenoid as in claim 29 wherein said rotary solenoid is provided in a printer including a detachably mountable ribbon cassette provided with said ribbon feed mechanism whereby said one-way clutch can be operatively coupled to said ribbon feed mechanism of said ribbon cassette when detachably mounted in position.

* * * * *